Oct. 2, 1956
S. ROBERTS
2,765,419
ELECTROLUMINESCENT CELL
Filed Nov. 3, 1951

Inventor:
Shepard Roberts,
by Paul A. Frank
His Attorney.

2,765,419
Patented Oct. 2, 1956

2,765,419

ELECTROLUMINESCENT CELL

Shepard Roberts, Scotia, N. Y., assignor to General Electric Company, a corporation of New York Application November 3, 1951, Serial No. 254,709

7 Claims. (Cl. 313—108)

This invention relates to an electroluminescent cell of the type known as a luminous capacitor. More particularly, the invention relates to an electroluminescent cell which dispenses with the necessity of using a layer of transparent conducting material in order to be visible.

Electroluminescent cells or luminous capacitors are light-emitting devices which resemble a flat plate condenser or capacitor in construction except that one of the plates is composed of glass with a transparent conducting material such as tin oxide on one surface and the space between the conducting surfaces is filled with a dielectric material in which a phosphor is suspended. When an alternating current flows through such a capacitor, visible light emitted by the phosphor may be seen through the layer of transparent conducting material.

Since the only presently known method of forming a transparent conducting layer is to coat tin oxide on glass, electroluminescent cells up to the present time have been limited as to their materials of construction. While plastics have been considered desirable, their use has been ruled out because a tin oxide layer cannot be made to adhere to a plastic.

It is, therefore, an object of this invention to produce an electroluminescent cell which will emit visible light without resorting to the use of a transparent conducting layer.

It is another object of this invention to provide an electroluminescent cell having a layer composed largely of opaque conducting material having gaps through which visible light may be observed.

It is another object of this invention to provide an electroluminescent cell which may be viewed through plastic which has a layer of opaque conducting material in contact therewith.

It is a further object of this invention to provide an electroluminescent cell which will avoid dielectric breakdown of the insulating layer when the power is turned on or off.

Briefly stated, in accordance with one embodiment of my invention, I substitute a fine-line grid of opaque conducting material for the layer of transparent conducting material normally used and back this layer of opaque material with a coating of transparent plastic or glass. In addition, I include a high resistance element in the operating circuit of my cell to avoid dielectric breakdown at the moment of energization or deenergization of the cell.

Figure 1:
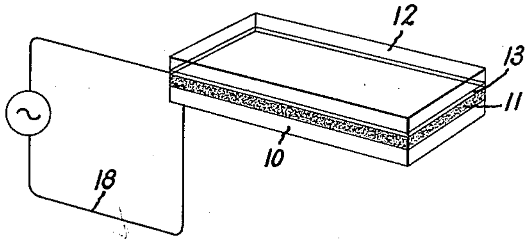
Figure 2:
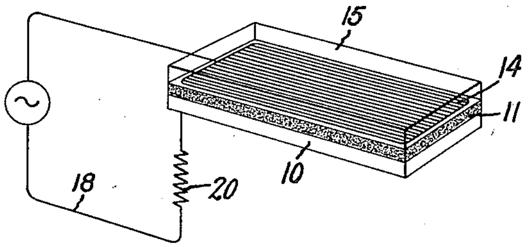
Figure 3:
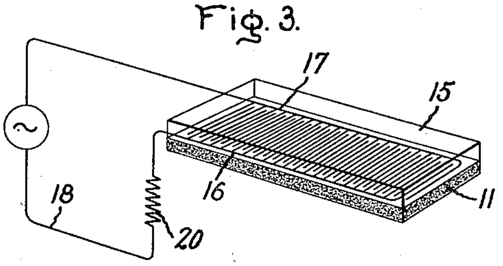

My invention will be better understood from the following description taken in conjunction with the accompanying drawing wherein Fig. 1 illustrates an electroluminescent cell of the type presently known; Fig. 2 is a schematic perspective drawing of one embodiment of my invention; and Fig. 3 is a schematic perspective view of still another embodiment of my invention.

In Fig. 1 a base plate 10 of conducting material has an overlying layer 11 of transparent dielectric material in which a phosphor such as zinc sulfide is suspended. Zinc sulfide electroluminescent phosphors are well known to the art, and may be found described in an article entitled, "The new phenomenon of electrophotoluminescence and its possibilities for the investigations of crystal lattice," by Prof. G. Destriau in the Philosophical Magazine, October 1947, vol. 38, page 700. A top plate 12 of glass having a thin layer 13 of tin oxide overlies the dielectric layer. When an alternating current circuit is connected to layers 10 and 13 in the manner shown, light is emitted by the phosphor suspended in the dielectric layer 11. This light is visible through the glass 12.

The cell of Fig. 2 is similar to that of Fig. 1 insofar as having the conducting base 10 is concerned and also the dielectric layer 11 in which the phosphor is suspended. However, instead of the transparent conducting layer 13 I provide a grid 14 composed of fine lines of an opaque conducting material such as silver paste or vaporized metal. The lines of the grid 14 are a few thousandths of an inch in width and are separated by a similar distance. Where conducting substances such as silver paste are used, the lines may be applied to the plastic using well-known printing techniques such as the silk screen process in which certain parts of a piece of silk cloth are made impervious in accordance with a pattern. The rest of the silk cloth or screen may then be impregnated with silver paste which will penetrate the screen and apply on the surface of the plastic in accordance with the pattern of the screen.

I have discovered that an opaque conducting mat or web such as that described above allows a considerable amount of light to emerge through the interstitial spaces. If the pattern is in the form of a clock dial or instrument face, the electroluminescent cell provides sufficient light for easy visibility. A protective layer 15 of paint or plastic may be positioned over the grid 14.

Fig. 3 illustrates an alternative embodiment of my invention wherein the two conducting layers are coplanar and interwoven but are insulated from each other. As in the case of Fig. 2, the phosphor is embedded in a dielectric layer 11. However, the alternating current flows between two grids 16 and 17 both of which are in engagement with the same side of the dielectric layer 11. The grids 16 and 17 are held in position by an overlying layer of plastic 15.

In Figs. 1, 2 and 3 the conducting layers are connected together through an alternating current circuit 18. The luminous intensity of the electroluminescent cell varies directly with the frequency of the current up to a certain point and with the voltage. An overvoltage will result in dielectric breakdown in the same manner as with any other type of capacitor. During energization and deenergization of the cell, there is a high voltage surge which endangers the dielectric. I have discovered that the incorporation of a resistance element 20 in the alternating circuit will minimize the effect of this surge and prevent dielectric breakdown.

The thickness of the layers shown is considerably exaggerated for purposes of illustration. While the base plate 10 and top plate or layer 15 may be made quite thick to impart stiffness to the cell, the dielectric layer 11 is of a thickness of the order of a few mils and the conducting grids 14, 16 and 17 are even thinner. The spacing of the grid lines is also considerably exaggerated.

My invention enables a transparent plastic to be used as a backing for one of the conducting layers instead of glass. However, glass may also be used for this purpose. In one embodiment of my invention I provide a top plate 15 made of glass or transparent plastic. The conducting mat in contact therewith may be composed of parallel or intersecting stripes of silver paste printed by the abovementioned silk screen process or aluminum which has been evaporated onto the top plate. A phosphor embedded in a layer of plastic is then sprayed over the conducting layer. The second conducting layer may now be sprayed, painted or printed silver paste or evaporated aluminum or aluminum foil. These materials readily lend themselves to use in this invention, but it is obvious that other materials which will conduct an electric current could be substituted for the silver or aluminum.

In a second embodiment of my invention, the top plate is glass or transparent plastic, as before. However, in this embodiment parallel conducting stripes with alternate stripes connected to opposing electric terminals as shown in Fig. 3 are used. A phosphor paint is then applied over the conducting layers.

In accordance with a third embodiment of my invention, the base material is a plastic film with phosphor particles incorporated therein. On one side of this film parallel or intersecting conducting stripes are applied. A continuous coating of conducting material is then applied to the other side.

In accordance with a fourth embodiment, a cell is made starting with a base of conducting material. A phosphor suspended in a plastic material is applied over this conducting material. Conducting stripes are then applied over this plastic layer and electrical connections are made between the base metal and the conducting stripes. In accordance with this embodiment a protecting layer of plastic over the conducting stripes is utilized to reduce corona and provide mechanical protection.

The several embodiments described above are illustrated in Figs. 2 and 3 except that in certain cases one of the non-conducting layers is omitted. Any of these cells, when incorporated in an alternating electric circuit having a resistance 20 of about 100,000 ohms in series, will have a long life and will operate satisfactorily on 60-cycle house current. While the present invention has been described by reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. An electroluminescent device comprising a conducting plate, a layer of electroluminescent phosphor material overlying said plate, and a mat of conducting material overlying said phosphor, said mat being loosely woven whereby parts of the phosphor material are visible through the interstitial spaces of said mat.

2. An electroluminescent device comprising a base of conducting material, a layer of dielectric material on said base, an electroluminescent phosphor suspended in said dielectric material, and a mat of wire arranged in a symmetrical pattern over said dielectric layer, the spacing between said wires being open and light transparent.

3. An electroluminescent device comprising a base of non-conducting transparent material, a layer of conducting material in contact therewith, said layer being composed of a wire mat, a layer of electroluminescent phosphor material overlying said mat, the spacing between said wires being open and light transparent, and a layer of conducting material overlying said phosphor layer.

4. The electroluminescent device of claim 3 wherein the non-conducting transparent material comprises a plastic.

5. A luminous capacitor comprising a layer of an electroluminescent phosphor material having a pair of oppositely disposed surfaces, a continuous planar layer of conducting material overlying one of said surfaces, a mat of conducting material overlying the other of said surfaces, said mat being loosely woven whereby parts of the phosphor material are visible through the interstitial spaces of said mat, and a layer of transparent non-conducting material overlying said conducting mat.

6. A luminous capacitor comprising a layer of dielectric material having an electroluminescent phosphor suspended therein and having a pair of oppositely disposed surfaces, a continuous planar layer of conducting material overlying one of said surfaces, a mat of conducting material overlying the other of said surfaces, said mat being loosely woven whereby parts of the phosphor material are visible through the interstitial spaces of said mat, and a layer of transparent non-conducting material overlying said conducting mat.

7. A luminous capacitor comprising a layer of dielectric material of high dielectric constant having an electroluminescent phosphor suspended therein and having a pair of oppositely disposed surfaces, a continuous planar layer of conducting material overlying one of said surfaces, a conducting grid comprising a mat of wire overlying the other of said surfaces, the spacing between said wires being open and light transparent, and a layer of transparent non-conducting material overlying said conducting grid.

References Cited in the file of this patent

UNITED STATES PATENTS

| | | |
|---|---|---|
| 2,152,809 | Liebmann | Apr. 4, 1939 |
| 2,277,101 | Heimann | Mar. 24, 1942 |
| 2,480,978 | Sunstein | Sept. 6, 1949 |
| 2,559,279 | Charles | July 3, 1951 |
| 2,566,349 | Mager | Sept. 4, 1951 |
| 2,624,857 | Mager | Jan. 6, 1953 |
| 2,684,450 | Mager et al. | July 20, 1954 |

OTHER REFERENCES

G. Destriau: New Phenomenon of Electrophotoluminescence, Philosophical Magazine, October 1947, vol. 38, pp. 700–702, 711–713, 723.